United States Patent [19]
Dorr

[11] Patent Number: 5,031,493
[45] Date of Patent: Jul. 16, 1991

[54] ULTRASONIC CONTROL SYSTEM FOR CUT-OFF OR SHEARING MACHINES

[75] Inventor: John A. Dorr, Crofton, Md.

[73] Assignee: Xecutek Corporation, Annapolis, Md.

[21] Appl. No.: 165,044

[22] Filed: Mar. 7, 1988

[51] Int. Cl.⁵ .................... B26D 3/16; B26D 5/40
[52] U.S. Cl. ............................... 83/13; 83/72; 83/363; 83/364; 83/370; 73/597
[58] Field of Search .......... 83/72, 209, 210, 363, 83/364, 370, 13; 73/597, 628, 632, 640; 33/1 P, 1 V

[56] References Cited

U.S. PATENT DOCUMENTS

| | | | |
|---|---|---|---|
| 2,989,883 | 6/1961 | Zimsky et al. | 83/363 |
| 3,108,469 | 10/1963 | Dyer et al. | |
| 3,149,519 | 9/1964 | Andersen | 83/363 |
| 3,184,969 | 5/1965 | Bolton | |
| 3,482,647 | 12/1969 | Lynch et al. | |
| 3,554,014 | 1/1971 | Berg et al. | |
| 3,834,233 | 9/1974 | Willis et al. | 73/290 V |
| 4,089,227 | 5/1978 | Falgari et al. | 73/640 |
| 4,210,969 | 7/1980 | Massa | 367/108 |
| 4,241,430 | 12/1980 | Kayem et al. | 367/115 |
| 4,248,087 | 2/1981 | Dennis et al. | 73/290 V |
| 4,254,478 | 3/1981 | Dumas | 367/2 |
| 4,339,972 | 7/1982 | Wepner et al. | 83/364 |
| 4,388,708 | 6/1983 | Skrgatic et al. | 367/2 |
| 4,448,207 | 5/1984 | Parrish | 128/771 |
| 4,470,299 | 9/1984 | Soltz | 73/290 V |
| 4,542,652 | 9/1985 | Reuter et al. | 73/597 |
| 4,543,649 | 9/1985 | Head et al. | 367/96 |
| 4,578,997 | 4/1986 | Soltz | 73/290 V |

Primary Examiner—Hien H. Phan
Attorney, Agent, or Firm—Jim Zegeer

[57] ABSTRACT

A shear mechanism is controlled by ultrasonically calipering the bar stock and adjusting the length of sheared bar stock to assure a uniform volume of metal bar stock in the sheared product. A plurality of ultrasonic transducers are carried in a common frame and centered on the bar stock using the same ultrasonic calipers.

5 Claims, 2 Drawing Sheets

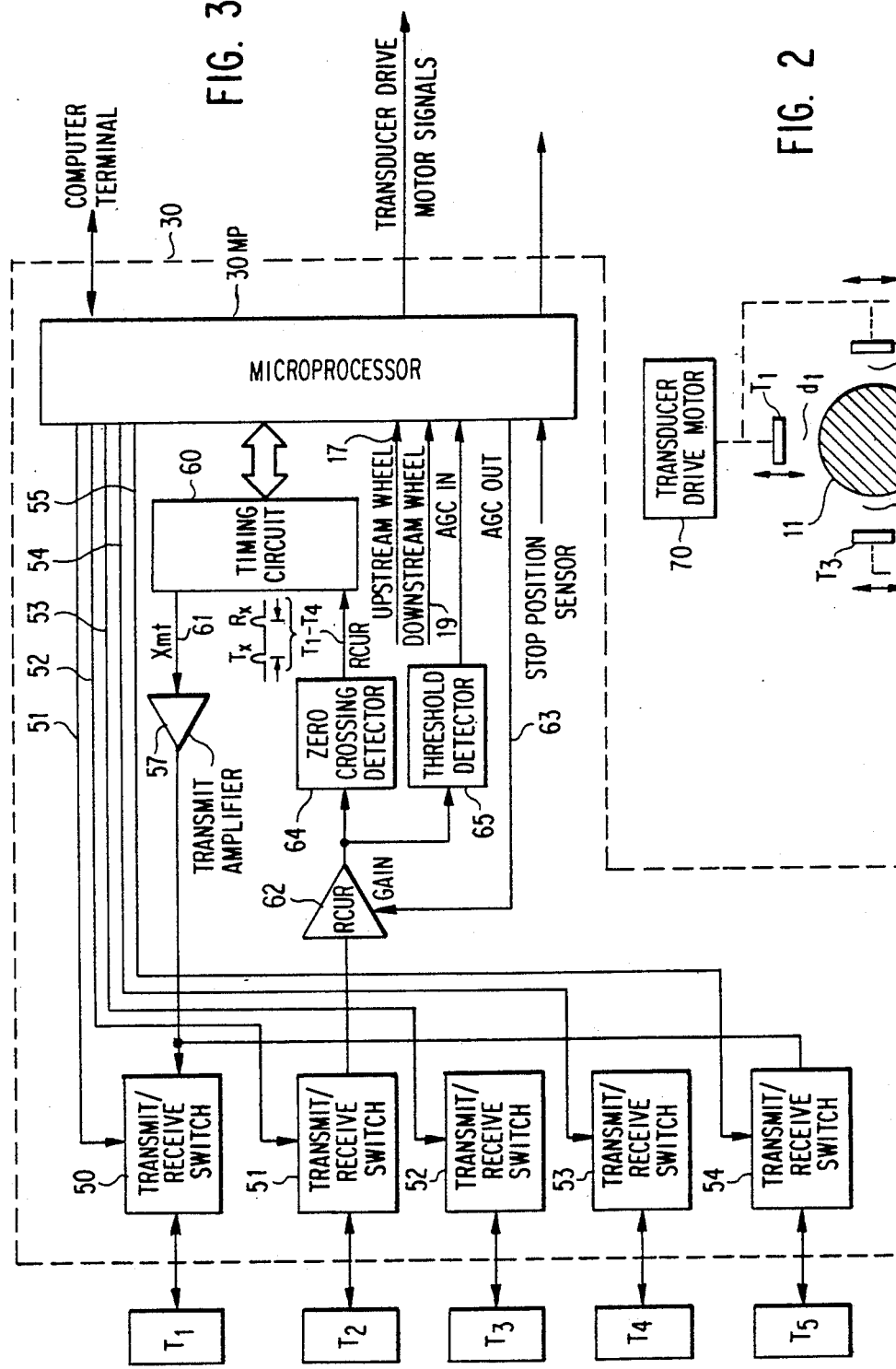

ULTRASONIC CONTROL SYSTEM FOR CUT-OFF OR SHEARING MACHINES

BACKGROUND AND BRIEF DESCRIPTION OF THE INVENTION

The present invention relates to ultrasonic control systems for cut-off or shearing machines. A cut-off machine is a shear that cuts steel bars into lengths called "molts" that are subsequently forged into shaped parts. The forging process requires molts of precise weight: if they are too light, they will not fill the mold, and if they are too heavy, they can break the machine. Usually, off-weight molts are scrapped because the hand processing required to make them usable costs more than does the loss as scrap. Since steel bars currently cost approximately $0.20/lb., and scrap sells for about $0.6/lb., a molt weighing up to about 20/lbs. can result in a scrap loss of about $3.00. Presently, approximately 20 to 30 percent of molts are scraped leading to scrap losses of $80,000/mo. for a cold forge of a typical commercial size. Hence, reductions in scrap losses can equate to substantial savings per machine.

The present invention is directed to solving this problem and relates to the use of ultrasonics to automate the cut-off machine to achieve more precise weights in the molts specifically by ultrasonically measuring or calipering the bar diameter as it is fed into the machine and adjusting bar stock length severed by the cut-off machine to compensate for the change in diameter from a predetermined diameter.

According to the present invention, opposing pairs of transducers are mounted to opposing sides of the path where the bar travels to ultrasonically caliper the bar stock on one diameter, and, a corresponding opposing pair is oriented transversely to the first pair to ultrasonically caliper the bar stock on another diameter so that each pair bisects a line passing through the opposing pair. A pair of the transducers is selected as the control pair and distance measurements between each transducer of that selected control pair to the surface of the bar stop is measured and all four transducers as a unit are adjusted by an adjustment motor so as to eliminate any difference in distance between the two opposing control parts. In this way, the transducers are precisely aligned with the central core axis of the bar stock and distance or caliper measurements between all four transducers then produce an accurate measure of the diameter of the bar stock in a highly expeditious and inexpensive fashion.

A speed of sound measuring transducer, as disclosed in my pending application Ser. No. 149,816 filed Jan. 29, 1988 now U.S. Pat. No. 4,938,066 and incorporated herein by reference, is utilized to provide a signal input which is a highly accurate measure of the velocity of sound in the medium which is utilized to compensate for any speed of sound variation in the air space between the bar stock and each of the transducers. One or more wheels are used to measure the movement of the bar stock and provide interrupt signals in the absence of bar stock material. The four signals from the opposing transducer pairs are utilized to compute the diameter of the bar stock and compute the length of bar stock needed to produce a given volume. In the conventional machine, a bar stock end sensor member is engaged by the leading or free end of the bar of stock and moved therewith. A rod member is moved with the end sensor member and the position of an adjustable magnet is sensed by a position sensor (similar to a proximity switch) so as to provide a signal corresponding to the end of the bar stock. Other displacement sensing devices well known in the art, such as optical discs, linear potentiometers, photo cells, etc., can be used to sense the amount or distance the end sensor moves. When the proper length of bar stock is fed into the shearing position, a grab or clamp mechanism secures the end portion being sheared while the shear is operated. In the shear machine, in the initial set-up, the operator adjusts the position of the magnet (using a calibrated dial) to thereby adjust the length of the bar stock to be sheared. The present invention augments this manual system by dynamically measuring and adjusting the sensed position of the leading end of the bar stock as a function of the change in diameter to assure that the volume of metal in the sheared sections are uniformly the same. A conventional computer terminal may be utilized to input factors such as the nominal diameter of the bar stock, the nominal length of molts desired.

BRIEF DESCRIPTION OF THE DRAWINGS

The above and other objects, advantages and features of the invention will become more apparent when considered with the following specification and accompanying drawings wherein:

FIG. 2 is a diagrammatic sectional view showing the positioning of the transducers relative to the bar stop, FIG. 3 is a block diagram of the transducer circuitry,

DETAILED DESCRIPTION OF THE INVENTION

Figure 1:
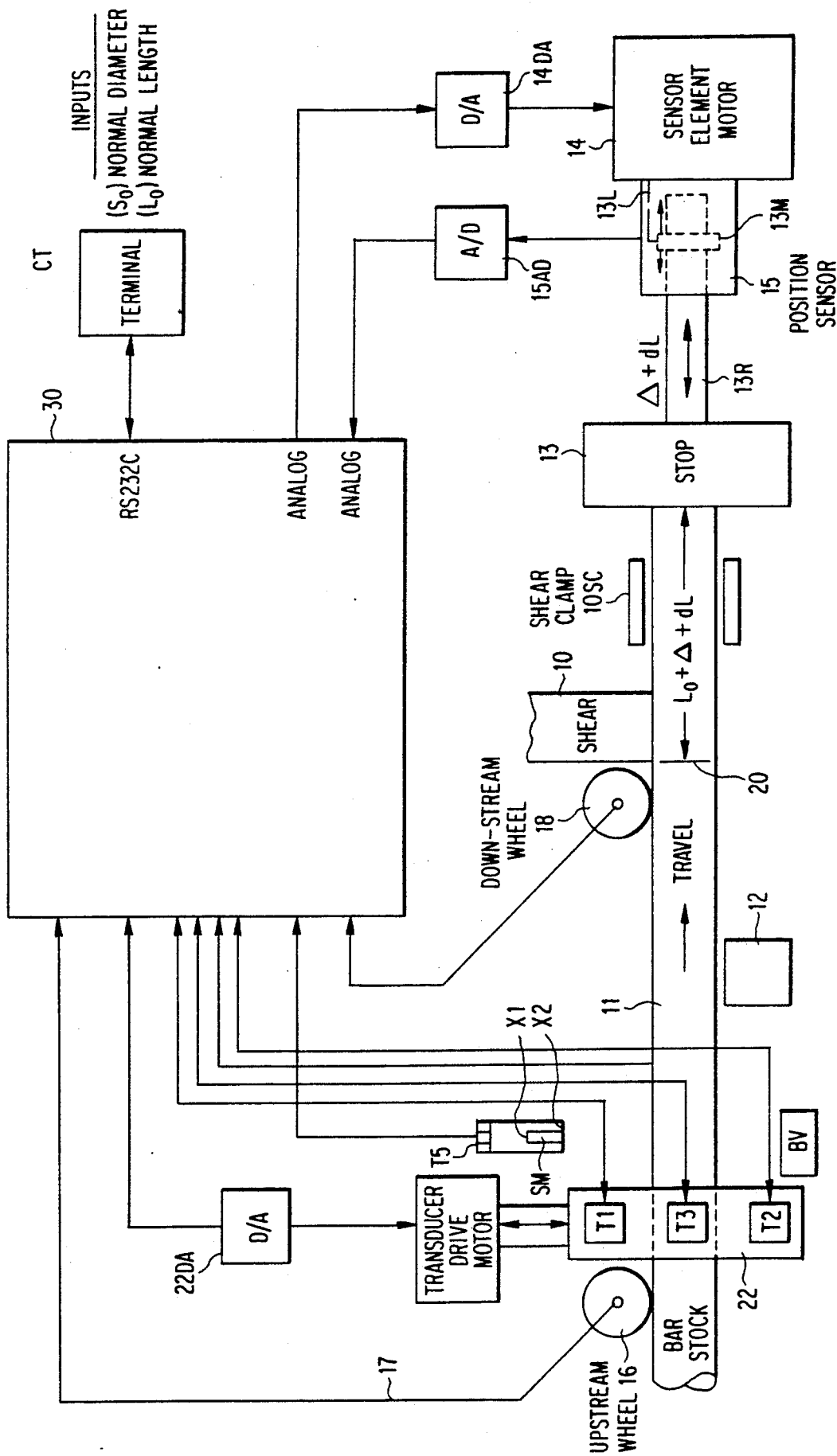
FIG. 1 is a system block diagram of a control system for a cut-off machine incorporating the invention.

Referring now to the block diagram shown in FIG. 1, a shearing mechanism 10 for shearing steel bar stock 11 includes a bar stock feed mechanism 12 for advancing the bar stock against the adjustable bar stock end sensing member or stop 13 which includes a rod 13R and sensor element or magnet 13M which is repositioned by a sensor element positioning motor 14 linked to by link 13L to sensor element 13M which is moved relative to position sensing device 15. As noted earlier, other forms of displacement sensors may be used to provide an indication of the location and displacement of the end of the bar of stock. An upstream wheel 16 engages the bar stock 11 and is rotated thereby and produces an interrupt signal on line 17 which is used to indicate the presence and velocity of the bar stock and initiate termination of the operation of the system upon sensing the end of the bar stock. A optional downstream wheel 18 is in similar engagement with the bar stock 11 and may be utilized to provide a second measure of the velocity of the bar stock just prior to entering the shear point designated as 20 and also produces a further interrupt signal to initiate termination of the operation. When position sensor 15 detects that the end of the bar stock is at the proper position, e.g., that the length of a bar stock from shear point to the end provides the desired volume of metal, shear clamp 10SC clamps the bar stock 11 preventing further infeed movement thereof while the shear 10 is operated to shear or sever the forward end of the bar stock. A terminal CT is coupled to computer 30 via a conventional RS232 port provides a keyboard input of the nominal diameter (So) and nominal length (Lo). The preferred embodiment of the present invention utilizes four ultrasonic distance measuring transducers T1, T2 and T3, T4 (see FIG. 2) and effectively ultrasonically caliper the bar stock on orthogonal points. The transducers are mounted in a frame 22 with transducers T1, T2 being axially aligned and transducers T3 and T4 being similar axially aligned in diametric opposition to the surfaces of the bar stock 11 and precisely orthogonally bisecting the axial line passing through transducers T1 and T2. Correspondingly, transducers T1 and T2 orthogonally bisect an axial line passing through transducers T3 and T4. While two sets of axially aligned transducers are illustrated, it will be appreciated that in some cases, one of the sets can be eliminated and in cases where higher accuracy is required, additional sets or ultrasonic pairs can be provided, depending on the bar stock cross-section. In the initial set-up operation, transducer drive motor 22DM is coupled to frame 22 and, depending on which pair of transducer is designated, the central pair, receives a control signal from computer 30 to precisely position the transducer relative to bar stock 11. In the illustrated embodiment, the bar stock 11 is illustrated as being circular and the four transducers can produce highly accurate diameter measurements. Since the distance between the transducer pairs is fixed, the range measurements are precise measurements which are used by computer 30 to dynamically compute the diameter of the moving bar stock. For a perfectly round bar stock, the two diameter measurements should, within limits, be equal. However, when they differ, they are averaged by the computer and the averaged diameter value used. Each of the transducers is enabled or excited in a predetermined sequence which, in the present case, will be transducers T1, T2, T3, T4, etc. Speed of sound transducer T5 may be interposed anywhere in the sequence. It is preferred that the transducers be excited by the same electrical frequency so that the ultrasonic pulses have essentially the same frequencies. Velocity measuring transducer T5 has a pair of fixed targets $X_1$ and $X_2$ spaced apart by a spacing member 5M of low coefficient of temperature expansion (all as disclosed and claimed in my copending application Ser. No. 149,816 filed Jan. 29, 1988, now U.S. Pat. No. 4,938,066, incorporated herein by reference). Targets $X_1$ and $X_2$ reflect ultrasonic pulses to provide a pair of pulses which have spacing accurately corresponding to the velocity of sound in the air, and which are supplied to the control microprocessor 30MP which performs the velocity of sound calculation and uses the result to adjust or modify the distance measurements made by transducers T1, T2, T3, and T4. A blower BV circulates common air through the spaces between the transducers T1, T2, T3 and T4 and the bar stock and the velocity transducer T5 and targets $X_1$ and $X_2$.

Each of the five transducers T1, T2, T3, T4 and T5 (which may be Polaroid ™ electrostatic transducers, piezoelectric transducers and the like) are driven by transmit/receive switches 50, 51, 52, 53 and 54 which receive selected enable signals on enable lines S1, S2, S3, S4 and S5, respectively. The microprocessor 30MP polls the transmit/receive switches 50, 51, 52, 53 and 54 in sequence and, at the same time, the microprocessor 30MP sends transmit signals which are amplified by transmit amplifier 57 and applied to all of the transmit/receive switches 50, 51, 52 and 53 and 54 so thus, when each of these transmit/receive switches is enabled, they are enabled to transmit the energizing pulse to their respective transducers T1, T2, T3, T4 and T5. As noted above, it will be appreciated that the energization of the transducers T1–T5 need not be in any particular sequence. At the same time, microprocessor 30MP supplies control signals and receives timing signals from a timing circuit 60 which is of the type shown and described in detail in my U.S. Pat. No. 4,715,226 issued Dec. 29, 1987. Thus, the timing circuit 60 delivers transmit signals on line 61 to transmit amplifier 57 which supplies the transmit drive signals to the transmit and receive switches 50, 51, 52, 53 and 54.

Ultrasonic echo signals received by each of transducers T1, T2, T3, T4 and T5 is received by the transmit/receive switches 50, 51, 52, 53 and 54, respectively, and delivered sequentially to receive amplifier 62 which receives a gain control signal from microprocessor 30MP on line 63 (labeled AGC OUT) to thereby adjust the gain of receiver 62 in a fashion well known in the art. The output from receiver 62 is applied to two detectors: (1) zero cross detector 64, and (2) a threshold detector 65, threshold detector 65 delivering the AGC signal into microprocessor 30MP which microprocessor, in turn, supplies the AGC control signal on line 63 to receiver 62. Both the threshold detector 65 and zero crossing detector 64 are shown and described in detail in my U.S. Pat. No. 4,715,226 and operate in essentially the same fashion.

An interrupt signal from upstream wheel 16 is provided on line 17 to the microprocessor 30MP to provide a signal indicative of the end of the bar stock 11 and also provide a measure of the velocity and length of the bar stock passing the transducer frame assembly 22. Downstream wheel 18 provides a similar signal on line 19 to the microprocessor at a point just in advance of the shear 10 and its shear line 20. The position sensor 15 produces a signal indicative of the position of the end of the bar stock relative to shear point 20. The distance between the stop face 13SF and shear point 20 is the nominal $l_o + (\Delta) + d_L$. The $(\Delta)$ is a fine adjustment made by the machine operator in the initial set-up and forms no part of the present invention. The position sensor 15 provides a signal on line 15S which may be an analog or digital form but in this embodiment is an analog signal which is converted by an analog-to-digital converter 15AD and supplied to the microprocessor 30MP. The sensor element drive motor 14 receives drive control signals from the microprocessor 30 through a digital-to-analog converter 14DA. (It will be appreciated that where analog signals are produced and are supplied to the microprocessor and/or where a microprocessor is supplying signals to an analog operated device that digital-to-analog and analog-to-digital conversions are carried out where necessary.)

The object is to keep the volume (V) constant with change in diameter (S) by adjusting the length (L). If So and Lo are the nominal diameter and length respectively, then:

$$\frac{\pi S^2 L}{4} = V = \frac{\pi S_o^2 L_o}{4} \tag{1}$$

and $$S^2 L = S_o^2 L_o = \text{constant}. \tag{2}$$

Differentiating yields $dL = \dfrac{-2L\,dS}{S}$ \qquad (3)

where dL is the change in length required to adjust for a change in diameter of dS.

Since it is difficult to keep track of L and S, it would be convenient to use the equation:

$$dL \approx \frac{-2L_o dS}{S_o} \quad (4)$$

Since $L/s/L_o/S_o = S_o^3/S^3$, and in the worst case $S_o/S = 1 \pm 0.01$, then equation (1) can be used with a maximum error of 3%.

In the initial set-up, when new bar stock is fed into the system, the transducer position adjust motor 70, is activated to accurately position frame 22 carrying transducers T1, T2, T3 and T4, respectively, relative to the bar stock 11 and receives transducer drive signals from the analog to digital converter 22DA and precisely adjusts the vertical position of transducers T1 and T2 and T3 and T4, respectively, by adjusting the position of the frame 22.

In operation, the transducers T1, T2, T3, T4 and T5 are energized by the enablement of transmit/receive switches 50-54, respectively, and their enabling signals on enable S1, S2, S3, S4 and S5, respectively, and, their respective signals are sequentially received and transmitted through receiver amplifier 62, threshold detector 65 to produce and AGC in signal which, in turn, produces an AGC out signal on line 63 to adjust the gain of receiver 62, and a zero crossing detector 64 pulses which are transmitted as receive signals to the timing circuit 60. The time between the transmit pulse $T_x$ and the echo or return pulse $R_x$ divided by two is proportional to the distance measurement between each transducer T1, T2, T3 and T4 and bar stock 11, subject to a correction factor for variation in ultrasonic speed because of variation in air temperature, humidity, etc. The timing circuit in conjunction with the microprocessor 30MP determines the time between the respective pulses at any transmit/receive switch, and applies a velocity correction as determined by the ultrasonic velocity detector transducer T5, blower BV assuring that the quality of air is the same at all transducers.

While the position of the transducer relative to bar stock 11 could be adjusted manually, a faster and more accurate initial set-up adjustment is by initially using one of the pairs of transducers to produce measurements for accurately positioning frame 22 by means of transducer drive motor 70. When a given bar of stock is advanced through transducer frame 22, a selected pair of opposed transducers is enabled to make the distance or range measurements and frame 22 adjusted by motor 70 to reach a null between the distance signals produced by that pair of transducers. This action precisely and simultaneously positions all four transducer so that both axially aligned pairs are precisely centered on opposing tangential points of the bar of stock. Thereafter, the distance or range signals are used to compute the running volume of bar stock.

The nominal diameter So and nominal length Lo are supplied from terminal CT as described earlier. These signals are used to cause the computer to adjust the initial desired position of member 13 so that shear 10 and shear clamp 10SC are operated to sever the initial length of bar stock to proper length. Each succeeding length of bar stock is ultrasonically calipered at two orthogonally related points and their length monitored by wheel 16 and the leading end sensed to dynamically provide all external parameters of the bar stock, including its position, to properly time the actuation of shear clamp 13SC and shear 13 and assure substantial volumetric uniformity of each sheared section of bar stock.

While I have shown and described a preferred embodiment of my invention, it will be appreciated that various modifications, adaptations and changes can be incorporated into the invention without departing from the spirit and scope thereof which is defined in the appended claims and it is intended to encompass such modifications and adaptations within the spirit and scope of the claims appended hereto:

What is claimed is:

1. In a method of controlling a shearing machine in which the end of a bar of stock engages and moves an end position sensing means to produce a shear signal and a shear is operated to shear a length of said stock, said end position sensing means being adjustable to control the volume of stock to be sheared/severed from said bar stock by varying the lengths of each sheared section of bar stock, the improvement comprising, ultrasonically measuring any changes in the diameter of said bar of stock by projecting at least a pair of range measuring ultrasonic beams in air to diametrically opposing surfaces of said bar of stock in advance of said shear, and measuring the ultrasonic energy travel times to said bar stock from each transducer, respectively, measuring the velocity of ultrasonic energy in said air to produce a compensation signal, converting said travel times and compensation signal to ultrasonically measured changes in diameter signals, converting ultrasonically measured changes in diameter signals to a control signal for controlling the operation of said shear as a function of any change in the diameter of said bar stock so that each sheared section of bar stock has substantially the same volume and automatically machine solving the equation:

$$dL = \frac{-2L_o dS}{S_o}$$

where
dL = the change in length of bar stock needed to maintain a constant volume,
Lo = the nominal length of bar stock to be sheared off,
So = the nominal diameter of the bar of stock, and
dS = the change of diameter.

2. The method defined in claim 1 wherein there are at least two pairs of said range measuring ultrasonic beam means which are orthogonally related, and measuring the ultrasonic energy travel times to said bar stock from each said transducer and taking the average thereof as the instantaneous diameter of said bar stock.

3. In a shearing machine control system having means for advancing a bar of stock, a shear for shearing a portion off the end of said bar stock, and means for measuring the position of the end surface of said bar stock as it is advanced into said shearing machine to produce signals for controlling the operation of said shear, the improvement comprising, (1) a first ultrasonic caliper comprised of a first pair of axially aligned ultrasonic transducers each of which is oriented to project ultrasonic pulse energy in air to diametrically opposite sides of said bar of stock, (2) a second ultrasonic caliper comprised of a second pair of axially aligned ultrasonic transducers, the axis of said second pair of transducers being orthogonal to and bisecting the space between said first pair of ultrasonic transducers, and each transducer of a pair being oriented to project ultrasonic pulse energy in air to diametrically opposite sides of said bar of stock, respectively, (3) means connected to each of said ultrasonic transducers for producing distance signals for the distance from each ultrasonic transducer to the respective surfaces of said bars of stock facing a given ultrasonic transducer, (4) computer means connected to receive the distance signals and producing signals corresponding to the cross-sectional area of said bar of stock, and determining therefrom the volume of stock in a predetermined portion of said bar of stock, and producing therefrom a shear stop control signal, (5) means controlled by said shear stop control signal for adjusting the time of operation of said shear so that all sheared lengths of said bar of stock have the same volume (6) transducer motor means for driving said transducers in a common plane normal to the axis of said bar of stock, and (7) said computer means including transducer motor control means connected to said transducer motor means for generating a transducer centering position control signal from the distance measurement signals of one of said pair of axially aligned ultrasonic transducers to cause said motor to position said transducers equidistantly from mutually transverse axes of said bar of stock.

4. The shearing machine control system defined in claim 3 including means for measuring the velocity of said ultrasonic energy in air and supplying same to said computer, and blower means for causing the circulation of air commonly through said means for measuring the velocity and the space between each of said transducers and said bar of stock as it is advanced therebetween, respectively.

5. In a shearing machine control system having means for advancing a bar of metal stock, a shear for shearing a portion of the end of said metal bar stock, and means for measuring the position of the end surface of said metal bar stock as it is advanced into said shearing machine to produce signals for controlling the operation of said shear, the improvement comprising, a plurality of ultrasonic calipers extending radially around said metal bar stock and spaced substantially equally therearound for sensing the cross-sectional area of said bar stock, each said electronic caliper being comprised of a pair of axially aligned ultrasonic transducers each of which is oriented to measuring the range in air to diametrically opposed surfaces of said bar stock in advance of said shear, means for measuring the velocity of said ultrasonic energy in air, computer means connected to all of said ultrasonic calipers and said means for measuring the velocity of said ultrasonic energy in air for converting ultrasonically measured changes in diameter to a control signal for controlling the operation of said shear as a function of any change in the diameter of said bar stock so that each sheared section of bar stock has substantially the same volume.

* * * * *